Figure 1:
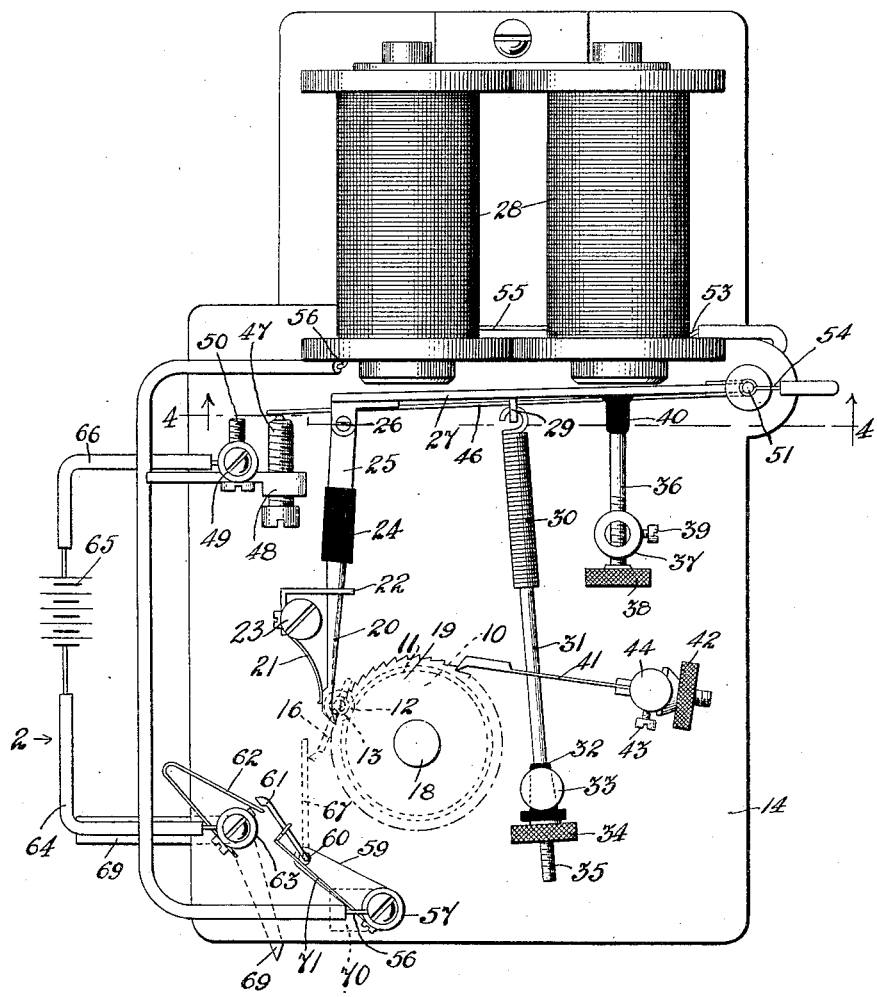

Feb. 14, 1933. L. AGOSTINI 1,897,830
ELECTRIC WIND FOR CLOCKS
Filed March 28, 1931 2 Sheets-Sheet 1

WITNESS:

INVENTOR
Louis Agostini
BY
Joshua R. H. Potts
HIS ATTORNEY

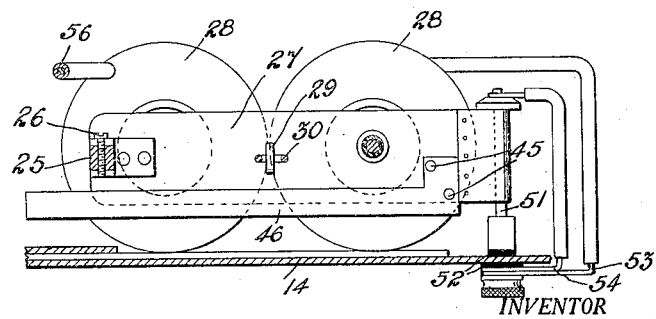

Patented Feb. 14, 1933

1,897,830

UNITED STATES PATENT OFFICE

LOUIS AGOSTINI, OF VINELAND, NEW JERSEY

ELECTRIC WIND FOR CLOCKS

Application filed March 28, 1931. Serial No. 525,919.

This invention relates to electric winds for clocks, and has for an object to provide improved means for employing electric magnetism for the purpose of maintaining the necessary tension upon the spring of the clock movement.

A further object of the invention is to provide a stem connected with the spring of a clock, said stem carrying a ratchet and a pawl co-acting with said ratchet, actuated by a spring, the tension of which is counteracted at times by the armature of an electro magnet.

The invention, therefore, comprises a clock movement of substantially the usual and ordinary type, having a spring for storage of power therein with a ratchet wheel associated with said spring, adapted when rotated to wind said spring, and a spring actuate pawl for coaction with the ratchet, the spring being subject to counteraction by the magnetism of an electro magnet deenergized from a circuit closed by the clock movement.

The invention is directed to other objects, and possesses other features of novelty and advantage, some of which, together with the foregoing, will be hereinafter more fully set forth.

In the drawings:
Figure 1 is a view of the clock winding organization seen in plan, Figure 2 is a view of the clock winding mechanism, in edge elevation, as indicated by arrow 2, at Figure 1, Figure 3 is a sectional view taken on line 3—3 of Figure 2, and Figure 4 is a sectional view taken on line 4—4 of Figure 1.

Like characters of reference indicate corresponding parts throughout the several views.

The electric wind, which forms the subject matter of this application is adapted to be associated with a clock movement of a variety of types. Such movement is conventionally represented in the drawings by a spring barrel 10, and its associated gear 11 and pinion 12. This pinion 12 is mounted upon the staff 13, journaled in the usual plates 14 and 15. The staff 13 carries an arm 16 clamped thereupon in any approved manner as by the screw 17. The function of this arm 16 will be hereinafter more fully explained.

A staff 18 is journaled to connect with the spring within the spring barrel 10, and carries upon the side of the plate 14 opposite the clock movement, a ratchet wheel 19. As the ratchet wheel 19 is rotated, the spring within the barrel 10 is subjected to winding stress.

For the purpose of winding the spring by the rotating of the ratchet 19, a pawl 20 is provided which engages the teeth of the ratchet 19 and is held to its work by a spring 21 which may be formed as an organization with the guide 22. This is supported by the pillar 23. The pawl 20 continuing by an insulating section 24, forms a part 25 which is hinged at 26 to the armature 27 of the electro-magnet 28. The armature 27 is provided with an eye 29 in which is engaged a spring 30. The spring 30 is connected with a rod 31 which passes through an insulating bushing 32, carried by a pillar 33, and adjustable by means of a knurled nut 34 upon the threaded section 35 of said rod 31.

The oscillation of the armature 27 under the opposed actions of the magnet 28 and the spring 30 is controlled by a stop consisting of the rod 36, threaded through the pillar 37, with a knurled head 38, and said screw 39 for attaining and maintaining an adjustment, an insulating head 40 being provided for engagement with the armature.

A spring detent 41 engages the teeth of the ratchet 19 and adjustment of this detent is attained by the knurled nut 42 and with set screw 43 for maintaining such adjustment, the whole being supported by the pillar 44.

Rigidly attached to the armature 27 in any approved manner, as by the rivets 45, is a spring arm 46 which makes physical engagement with the contact 47. The contact 47 is carried by the arm 48 slidably mounted relative to its supporting pillar 49, and the attained adjustment maintained by the screw 50. The armature 27, and consequently the spring arm 46, are mounted upon the pin 51 which is insulated from the plate 14 as shown at 52. One wire 53 from the magnet 28 leads to and is connected with the pin 51, but a second wire 54 preferably extends from the wire 53 and is connected with the opposite end of the pin 51, thus insuring a complete circuit. Of course, the two units of the magnet 28 are interconnected by the wire 55, and a wire 56 leads from the opposite side of the magnet to the pillar 57. The pillar 57 is insulated as shown at 58 from the plate 14, and carries an arm 59 spaced above said plate, but in electric connection with the wire 56. Pivoted in said arm 59 is a staff 60 which has an arm 61 positioned to engage the spring contact 62 carried by the pillar 63. From the pillar 63 a wire 64 extends to a source of current supply 65 from the opposite side of which a wire 66 extends to the pillar 49.

The staff 60, pivoted in the arm 59, extends through the plate 14 and is provided with an arm 67 which has an insulating extremity 68 in position for engagement by the arm 16 as the staff 13 rotates.

Mounted also upon the pillar 63 is a manual switch 69 adapted to engage the contact 70, carried by the pillar 57. Secured also to the pillar 57 is a spring 71 tending to yieldingly hold the arm 61 out of engagement with the spring contact 62.

In operation, assuming that the function of the movement is to be initiated, and that the spring in the barrel 10 is therefore fully relaxed, the manual switch 69 is closed, whereupon, current from the source 65 flows through the wire 64 to the pillar 63, to the spring contact 62, arm 61, arm 59, pillar 57 and wire 56 to the electro-magnet 28, returning through the wires 53 and 54, the spring arm 46, contact 47 and wire 66 to source. This will energize the magnet 28, attracting the armature 27 against the tension of the spring 30 and retracting the pawl 20. The movement of the armature 27, carrying therewith the spring arm 46, will break contact at 47, whereupon, the magnet will, of course, be deenergized, and the spring retracting the armature 27 will, through the engagement of the pawl 20 upon the ratchet 19, rotate such ratchet.

This electro-magnetic movement is well known, and so long as the manual switch is maintained in closed position, the armature 27 will continue to vibrate to reciprocate the pawl 20. When, however, the spring in the barrel 10 has been completely wound, the resistance of such spring will overcome the tension of the spring 30, and no further action will be performed. No matter if the manual switch be maintained in closed position, the winding of the clock spring will be delayed until sufficient laxness in said spring has been provided by the running of the clock movement.

The clock spring, having been under tension by the manual switch as above outlined, the clock movement will function in the usual manner. The functioning of the clock movement will rotate the pinion 12 and staff 13, and therewith, the arm 16. When the arm 16 physically engages the insulating end 68 of the arm 67, the arm 61 is moved to engage the spring contact 62. The closing of this spring contact 62 with the arm 61 connects the pillars 57 and 63 exactly as happens when the manual switch 69 is closed. At each rotation of the staff 13, therefore, the circuit to the magnet 28 is closed for such time as the arm 61 is held in engagement with the spring contact 62 by the arm 16. Immediately upon the passing of the arm 16 from such physical engagement, the spring 71 will swing the arm 61 to open position, as shown at Figure 1, whereupon, the magnet is deenergized.

The arm 16, may of course, be attached to any rotating staff of the clock movement, but it is the intent of the present invention to attach it to a staff rotating at relatively short intervals so that the winding of the spring may be accomplished also at relative short intervals, whereby the tension of the spring is maintained substantially constant. One reason for faulty functioning of an ordinary clock movement is the difference in tensioning of the spring during considerable intervals between winding. Ordinary clock movements have a staff rotating once each eight minutes, and while the arm 16 may be attached to any staff, it is the intent of this invention to attach it to the staff just mentioned so that the winding of the clock may be undertaken at intervals slightly less than eight minutes apart, such a difference being consumed in the time of winding.

It is also intended that the time of winding provided by the time of contact of the arm 16 with the arm 67 shall be slightly greater than enough to wind the spring to its capacity. This is made desirable in that there may occur periods when the current is not available and one or more winding periods may be passed without winding.

By providing an overrun in the mechanism, the failure to wind at any particular period is quickly compensated for during several succeeding winding intervals so that irrespective of failure of current at times, the spring is kept under sufficient tension to properly actuate the movement. It has been explained that if the overrun of winding actuation is greater than the capacity of the spring, the resistance of the spring of the clock will simply over-balance the tension of the spring 30 and the vibration of the armature 27 be resisted by the pawl 20, holding the spring arm 46 out of contact with the arm 47, and therefore, with the circuit broken.

Of course, the electric wind for clocks, herein illustrated, may be modified in various ways without departing from the invention herein set forth and hereinafter claimed.

The invention is hereby claimed as follows:

1. The combination with a journaled spring motor and geared organization driven therefrom, of an arm carried by the organization and moving in an orbit, an electro-magnet, means actuated by said arm for closing a circuit to the electro-magnet, a ratchet connected with the journal, a pawl making engagement with said ratchet and mounted to reciprocate, an armature for the electro-magnet controlling the reciprocation of said pawl, a spring connected with said armature tending to move the pawl in power increasing direction, and means associated with said armature and magnet to provide a vibration of said armature.

2. The combination with a spring driven motor and a rotating member, an arm carried by the rotating member, a staff journalling the spring, a ratchet carried by the staff, an electro-magnet, an armature for the magnet, a make and break controlled by the armature, a pawl carried by the armature adapted to engage the ratchet, and a lever oscillated by the arm carried by the rotating member for periodically closing the circuit to the electro-magnet.

3. The combination with a spring driven motor and a rotating part, an arm carried by the rotating part, a staff journalling the motor spring, a ratchet wheel carried by the staff, a pawl mounted to reciprocate in operative engagement with the perimeter of the ratchet wheel, yielding means for holding the pawl to its work, a spring operating the pawl to rotate the ratchet, an electro-magnet, an armature for the electro-magnet connected with the pawl tending to move the pawl against the stress of the spring, make and break mechanism carried by the armature, and a mechanical switch for the magnet circuit adapted to be closed by the rotary travel of the arm.

In testimony whereof I have signed my name to this specification.

LOUIS AGOSTINI.